US010933698B2

(12) United States Patent
Lundgren

(10) Patent No.: US 10,933,698 B2
(45) Date of Patent: Mar. 2, 2021

(54) MATERIAL INCLUSION TREAD

(71) Applicant: Bridgestone Americas Tire Operations, LLC, Nashville, TN (US)

(72) Inventor: Paula R. Lundgren, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 182 days.

(21) Appl. No.: 14/435,464

(22) PCT Filed: Oct. 24, 2013

(86) PCT No.: PCT/US2013/066479
§ 371 (c)(1),
(2) Date: Apr. 14, 2015

(87) PCT Pub. No.: WO2014/066563
PCT Pub. Date: May 1, 2014

(65) Prior Publication Data
US 2015/0258861 A1  Sep. 17, 2015

Related U.S. Application Data

(60) Provisional application No. 61/718,360, filed on Oct. 25, 2012.

(51) Int. Cl.
*B60C 11/11* (2006.01)
*B60C 11/13* (2006.01)
*B60C 11/12* (2006.01)

(52) U.S. Cl.
CPC .......... *B60C 11/1307* (2013.01); *B60C 11/11* (2013.01); *B60C 11/1323* (2013.01); *B60C 2011/1213* (2013.01); *B60C 2011/133* (2013.01)

(58) Field of Classification Search
CPC . B60C 11/11; B60C 11/1307; B60C 11/1323; B60C 2011/133
See application file for complete search history.

(56) References Cited

U.S. PATENT DOCUMENTS

2001/0032691 A1* 10/2001 Ohsawa ................. B60C 11/13
152/209.18
2002/0092591 A1*  7/2002 Cortes ................ B60C 11/0309
152/209.18
(Continued)

FOREIGN PATENT DOCUMENTS

DE        102008037477 A1    4/2010
EP            2030810 A1    3/2009
(Continued)

OTHER PUBLICATIONS

Machine translation for Japan 2007-182096 (no date).*
(Continued)

*Primary Examiner* — Steven D Maki
(74) *Attorney, Agent, or Firm* — Shaun J. Fox; John Skeriotis

(57) ABSTRACT

Provided is a tire comprising a radial direction, an axial direction, a circumferential direction, and a tire lug. The tire lug may be bounded by a plurality of surfaces. The plurality of surfaces may comprise a top surface and a first side surface oriented at a first angle to the top surface. The top surface may extending in the axial direction and the circumferential direction. The first angle may be greater than 90 degrees. The first side surface may comprise a first cavity of the first side surface. The first side surface may have a height and a width.

15 Claims, 4 Drawing Sheets

(56) References Cited

U.S. PATENT DOCUMENTS

| | | | |
|---|---|---|---|
| 2004/0112494 A1* | 6/2004 | Colombo | B60C 11/0302 152/209.18 |
| 2005/0081971 A1 | 4/2005 | Heinen | |
| 2008/0047641 A1* | 2/2008 | Takahashi | B60C 11/0309 152/209.3 |
| 2008/0105348 A1* | 5/2008 | Byrne | B60C 11/0302 152/209.18 |

FOREIGN PATENT DOCUMENTS

| | | | |
|---|---|---|---|
| JP | 63-141804 A | * | 6/1988 |
| JP | 63-188505 A | * | 8/1988 |
| JP | 02-041802 U | * | 3/1990 |
| JP | 64-009009 A | * | 1/1999 |
| JP | 2005193702 A | | 7/2005 |
| JP | 2005324685 A | | 11/2005 |
| JP | 2007-182096 A | * | 7/2007 |
| JP | 2007-182096 A | | 7/2007 |
| KR | 2010037863 A | | 4/2010 |
| WO | 200243972 A1 | | 6/2002 |

OTHER PUBLICATIONS

Machine translation for Japan 63-141804 (no date).*
Machine translation for Japan 02-041802 U (no date).*
Machine translation for Japan 63-188505 (no date).*
Machine translation for Japan 64-009009 (Year: 2019).*
Peschel, Wolfgang, Supplemental European Search Report from EP13848911, dated May 18, 2016, Munich.
Examiner's Requisition, Corresponding Canadian Application No. 2,888,158, dated Feb. 26, 2016.
Song, Ho Keun, International Search Report with Written Opinion from PCT/US2013/066479, 11 pp. (dated Jan. 24, 2014).
Office Action Issued for Corresponding Russian Patent Application No. 2015114645, dated Apr. 4, 2016.

* cited by examiner

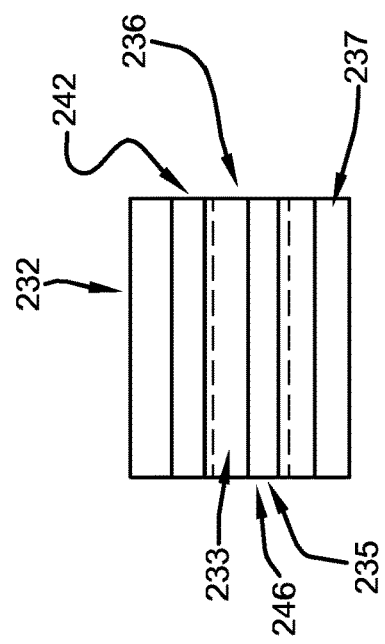
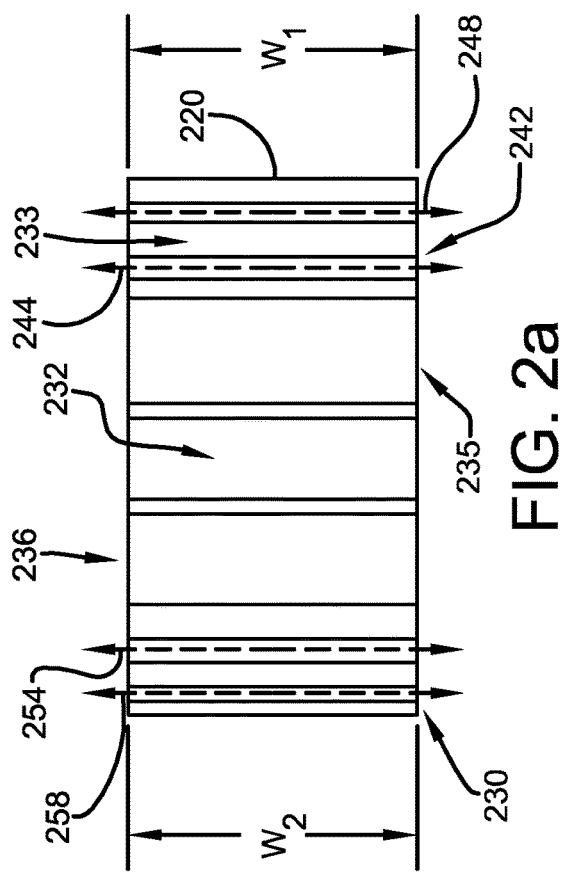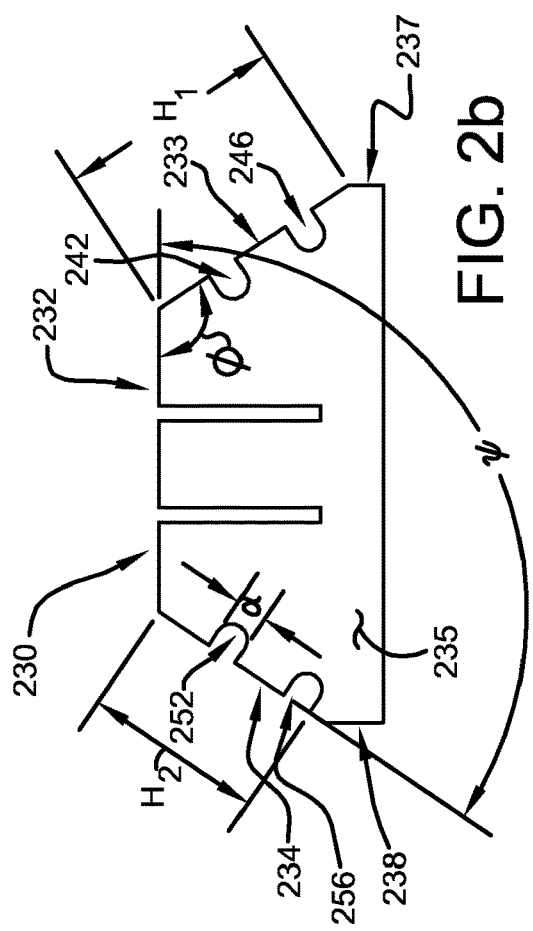

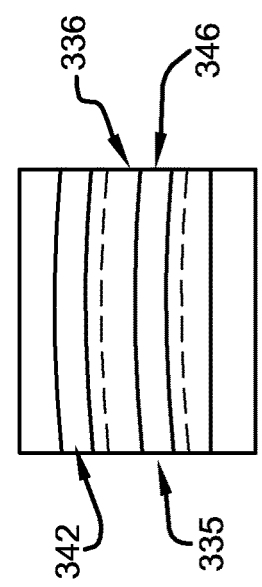
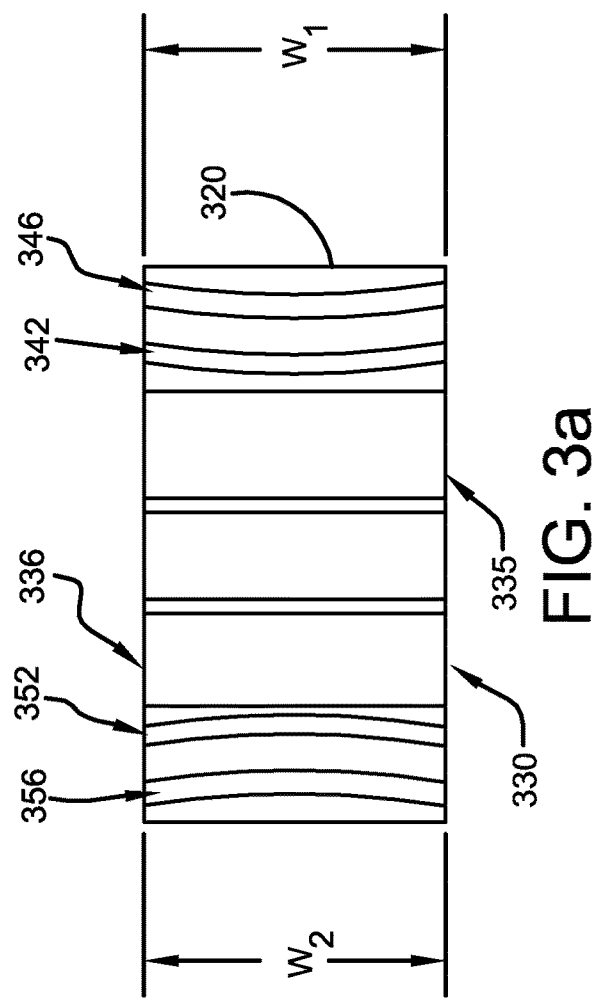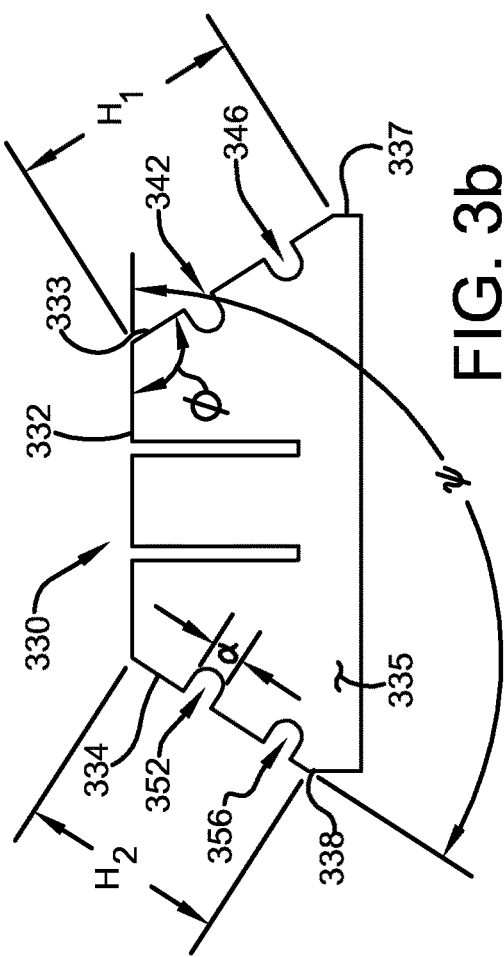

MATERIAL INCLUSION TREAD

TECHNICAL FIELD

The present subject matter relates generally to a tire tread. More, specifically, the present subject matter relates to a tire or tire tread comprising a material inclusion feature.

BACKGROUND

Tires may be operated on a variety of operational surfaces. Operational surfaces may include off-road surfaces as well as different sorts of roadway surfaces. Operational surfaces may include material comprising, one or more of dirt, gravel, pebbles, sand, clay, mud, snow, ice, or other debris It may be desirable to promote tire traction. Tire traction is a function of frictional and adhesive forces between the compound forming the external surface of the tire tread and the operational surface upon which the tire is operated. Tire traction is also a function of frictional and cohesive forces between roadway material engaged with the external surface of the tire tread and similar roadway material in or on the operational surface upon which the tire is operated. Accordingly, engagement of a substantial amount of roadway material with the tire tread may improve tire traction under certain operational conditions.

It remains desirable to develop tire tread which is adapted to engage substantial amounts of roadway material with the tire tread.

SUMMARY

Provided is a tire comprising a radial direction, an axial direction, a circumferential direction, and a tire lug. The tire lug may be bounded by a plurality of surfaces. The plurality of surfaces may comprise a top surface and a first side surface oriented at a first angle to the top surface. The top surface may extend in the axial direction and the circumferential direction. The first angle may be greater than 90 degrees. The first side surface may comprise a first cavity of the first side surface. The first side surface may have a height and a width.

BRIEF DESCRIPTION OF THE DRAWINGS

FIG. 2a is a top orthogonal projection of a first embodiment of a material inclusion tire tread lug.

FIG. 2b is a front orthogonal projection of a first embodiment of a material inclusion tire tread lug.

FIG. 2c is a side orthogonal projection of a first embodiment of a material inclusion tire tread lug.

FIG. 3a is a top orthogonal projection of a second embodiment of a material inclusion tire tread lug.

FIG. 3b is a front orthogonal projection of a second embodiment of a material inclusion tire tread lug.

FIG. 3c is a side orthogonal projection of a second embodiment of a material inclusion tire tread lug.

DETAILED DESCRIPTION

Reference will be made to the drawings, FIGS. 1-7, wherein the showings are only for purposes of illustrating certain embodiments of a material inclusion tread and of a tire comprising a material inclusion tread.

Figure 1:
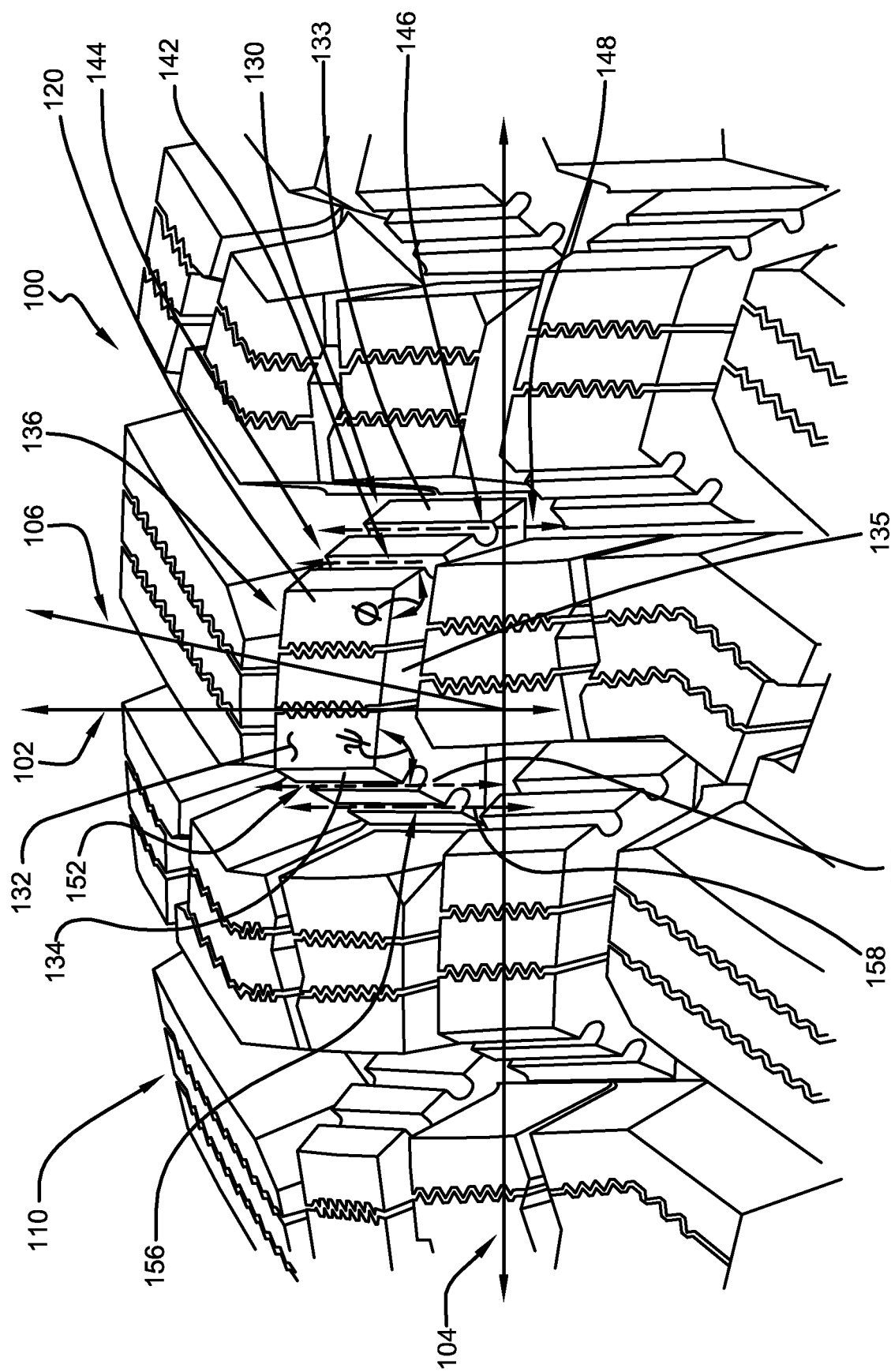
FIG. 1 is a close-up perspective view of one embodiment of a tire comprising a material inclusion tire tread.

Referring now to FIG. 1, a tire 100 may define a radial direction 102, an axial direction 106, and a circumferential direction 104. The tire 100 may comprise a tire tread 110 which defines the external surface of the tire 100 adapted for operational engagement with an operational surface (not shown) upon which the tire may be operated. The tire 100 may comprise a tire lug 120. Tire lug 120 may be one component of the tire tread 110.

The non-limiting embodiment shown in FIG. 1 shows a tire lug 120 may be bounded by a plurality of surfaces 130 such as, without limitation, a top surface 132, a first side surface 133, a second side surface 134, a third side surface 135, and a fourth side surface 136. With continued reference to the non-limiting embodiment shown in FIG. 1, tire lug 120 may approximate a trapezoidal prism with a top surface 120 extending in the axial direction 106 and the circumferential direction 104. In certain other embodiments, a tire lug may approximate a rectangular prism, another type of prism, a truncated pyramid, or another shape chosen with good engineering judgment. In certain other embodiments, a top surface may be oblique to or angled with respect to one or both of the axial direction 106 and the circumferential direction 104.

With continued reference to the non-limiting embodiment shown in FIG. 1, a first side surface 133 may be oriented at a first angle φ to the top surface 132. In certain other embodiments, a first side surface 133 may be oblique to a top surface 132. First angle φ may be greater than 90 degrees, between 100 and 150 degrees, inclusive, between 120 and 130 degrees, inclusive, or some other angle chosen with good engineering judgment. First side surface 133 may have a height and a width. First side surface 133 may comprise a first cavity of the first side surface 142. First side surface 133 may comprise a second cavity of the first side surface 146.

With continued reference to the non-limiting embodiment shown in FIG. 1, the first cavity of the first side surface 142 may be an elongated linear slot. In certain other embodiments, the first cavity of the first side surface 142 may comprise one or more of an elongated curvilinear slot or a dimple. The first cavity of the first side surface 142 defines a first axis of elongation 144. The first cavity of the first side surface 142 has a cross-section perpendicular to the first axis of elongation 144 that is substantially semi-oval. In certain other embodiments, the first cavity of the first side surface may have a cross-section that is substantially semicircular, semi-oval, semielliptical, a parabolic section, a hyperbolic section, or another shape chosen with good engineering judgment. In the non-limiting embodiment shown in FIG. 1, the first cavity of the first side surface 142 extends the full width of the first side surface 133. In certain other embodiments, the first cavity of the first side surface 142 may have a length less than or greater than the width of the first side surface 133. In certain other embodiments, the first cavity of the first side surface 142 may have a length between 30% and 120%, inclusive, of the width of the first side surface 133. In the non-limiting embodiment shown in FIG. 1, the first cavity of the first side surface 142 extends in a direction having an angle of approximately 90 degrees with respect to the radial direction 102. In certain other embodiments, the first cavity of the first side surface 142 may extend in a direction having an angle of between 60 degrees and 90 degrees, inclusive, with respect to the radial direction 102, or between 80 degrees and 90 degrees, inclusive, with respect to the radial direction 102. In the non-limiting embodiment shown in FIG. 1, the first cavity of the first side surface 142 extends in a direction having an angle of approximately 90 degrees with respect to the axial direction 106. In certain other embodiments, the first cavity of the first side surface 142 may extend in a direction having an angle of between 5 degrees and 90 degrees, inclusive, with respect to the axial direction 106.

With continued reference to the non-limiting embodiment shown in FIG. 1, second cavity of the first side surface 146 may be an elongated linear slot. In certain other embodiments, the second cavity of the first side surface 146 may comprise one or more of an elongated curvilinear slot or a dimple. The second cavity of the first side surface 146 defines a second axis of elongation 148. The second cavity of the first side surface 146 has a cross-section perpendicular to the second axis of elongation 148 that is substantially semi-oval. In certain other embodiments, the second cavity of the first side surface may have a cross-section that is substantially semicircular, semi-oval, semielliptical, a parabolic section, a hyperbolic section, or another shape chosen with good engineering judgment. In the non-limiting embodiment shown in FIG. 1, the second cavity of the first side surface 146 extends the full width of the first side surface 133. In certain other embodiments, the second cavity of the first side surface 146 may have a length less than or greater than the width of the first side surface 133. In certain other embodiments, the second cavity of the first side surface 146 may have a length between 30% and 120%, inclusive, of the width of the first side surface 133. In the non-limiting embodiment shown in FIG. 1, the second cavity of the first side surface 146 extends in a direction having an angle of approximately 90 degrees with respect to the radial direction 102. In certain other embodiments, the second cavity of the first side surface 146 may extend in a direction having an angle of between 60 degrees and 90 degrees, inclusive, with respect to the radial direction 102, or between 80 degrees and 90 degrees, inclusive, with respect to the radial direction 102. In the non-limiting embodiment shown in FIG. 1, the second cavity of the first side surface 146 extends in a direction having an angle of approximately 90 degrees with respect to the axial direction 106. In certain other embodiments, the second cavity of the first side surface 146 may extend in a direction having an angle of between 5 degrees and 90 degrees, inclusive, with respect to the axial direction 106.

With continued reference to the non-limiting embodiment shown in FIG. 1, a second side surface 134 may be oriented at a second angle ψ to the top surface 132. In certain other embodiments, a second side surface 134 may be oblique to a top surface 132. Second angle ψ may be greater than 90 degrees, between 100 and 150 degrees, inclusive, between 120 and 130 degrees, inclusive, or some other angle chosen with good engineering judgment. Second side surface 134 may have a height and a width. Second side surface 134 may comprise a first cavity of the second side surface 152. Second side surface 134 may comprise a second cavity of the second side surface 156.

With continued reference to the non-limiting embodiment shown in FIG. 1, the first cavity of the second side surface 152 may be an elongated linear slot. In certain other embodiments, the first cavity of the second side surface 152 may comprise one or more of an elongated curvilinear slot or a dimple. The first cavity of the second side surface 152 defines a third axis of elongation 154. The first cavity of the second side surface 152 has a cross-section perpendicular to the third axis of elongation 154 that is substantially semi-oval. In certain other embodiments, the first cavity of the second side surface may have a cross-section that is substantially semicircular, semi-oval, semielliptical, a parabolic section, a hyperbolic section, or another shape chosen with good engineering judgment. In the non-limiting embodiment shown in FIG. 1, the first cavity of the second side surface 152 extends the full width of the second side surface 134. In certain other embodiments, the first cavity of the second side surface 152 may have a length less than or greater than the width of the second side surface 134. In certain other embodiments, the first cavity of the second side surface 152 may have a length between 30% and 120%, inclusive, of the width of the second side surface 134. In the non-limiting embodiment shown in FIG. 1, the first cavity of the second side surface 152 extends in a direction having an angle of approximately 90 degrees with respect to the radial direction 102. In certain other embodiments, the first cavity of the second side surface 152 may extend in a direction having an angle of between 60 degrees and 90 degrees, inclusive, with respect to the radial direction 102, or between 80 degrees and 90 degrees, inclusive, with respect to the radial direction 102. In the non-limiting embodiment shown in FIG. 1, the first cavity of the second side surface 152 extends in a direction having an angle of approximately 90 degrees with respect to the axial direction 106. In certain other embodiments, the first cavity of the second side surface 152 may extend in a direction having an angle of between 5 degrees and 90 degrees, inclusive, with respect to the axial direction 106.

With continued reference to the non-limiting embodiment shown in FIG. 1, second cavity of the second side surface 156 may be an elongated linear slot. In certain other embodiments, the second cavity of the second side surface 156 may comprise one or more of an elongated curvilinear slot or a dimple. The second cavity of the second side surface 156 defines a fourth axis of elongation 158. The second cavity of the second side surface 156 has a cross-section perpendicular to the fourth axis of elongation 158 that is substantially semi-oval. In certain other embodiments, the second cavity of the second side surface may have a cross-section that is substantially semicircular, semi-oval, semielliptical, a parabolic section, a hyperbolic section, or another shape chosen with good engineering judgment. In the non-limiting embodiment shown in FIG. 1, the second cavity of the second side surface 156 extends the full width of the second side surface 134. In certain other embodiments, the second cavity of the second side surface 156 may have a length less than or greater than the width of the second side surface 134. In certain other embodiments, the second cavity of the second side surface 156 may have a length between 30% and 120%, inclusive, of the width of the second side surface 134. In the non-limiting embodiment shown in FIG. 1, the second cavity of the second side surface 156 extends in a direction having an angle of approximately 90 degrees with respect to the radial direction 102. In certain other embodiments, the second cavity of the second side surface 156 may extend in a direction having an angle of between 60 degrees and 90 degrees, inclusive, with respect to the radial direction 102, or between 80 degrees and 90 degrees, inclusive, with respect to the radial direction 102. In the non-limiting embodiment shown in FIG. 1, the second cavity of the second side surface 156 extends in a direction having an angle of approximately 90 degrees with respect to the axial direction 106. In certain other embodiments, the second cavity of the second side surface 156 may extend in a direction having an angle of between 5 degrees and 90 degrees, inclusive, with respect to the axial direction 106.

The non-limiting embodiment shown in FIGS. 2a-2c shows a tire lug 220 may be bounded by a plurality of surfaces 230 such as, without limitation, a top surface 232, a first side surface 233, a second side surface 234, a third side surface 235, and a fourth side surface 236, a fifth side surface 237, and a sixth side surface 238.

With continued reference to the non-limiting embodiment shown in FIGS. 2a-2c, a first side surface 233 may be oriented at a first angle φ to the top surface 232. In certain other embodiments, a first side surface 233 may be oblique to a top surface 232. First angle φ may be greater than 90 degrees, between 100 and 150 degrees, inclusive, between 120 and 130 degrees, inclusive, or some other angle chosen with good engineering judgment. First side surface 233 may have a height, $H_1$, and a width, $W_1$. First side surface 233 may comprise a first cavity of the first side surface 242. First side surface 233 may comprise a second cavity of the first side surface 246.

With continued reference to the non-limiting embodiment shown in FIGS. 2a-2c, the first cavity of the first side surface 242 may be an elongated linear slot. In certain other embodiments, the first cavity of the first side surface 242 may comprise one or more of an elongated curvilinear slot or a dimple. The first cavity of the first side surface 242 defines a first axis of elongation 244. The first cavity of the first side surface 242 has a cross-section perpendicular to the first axis of elongation 244 that is substantially semi oval. In certain other embodiments, the first cavity of the first side surface may have a cross-section that is substantially semicircular, semi-oval, semielliptical, a parabolic section, a hyperbolic section, or another shape chosen with good engineering judgment. In the non-limiting embodiment shown in FIGS. 2a-2c, the first cavity of the first side surface 242 extends the full width, $W_1$, of the first side surface 233. In certain other embodiments, the first cavity of the first side surface 242 may have a length less than or greater than the width, $W_1$, of the first side surface 233. In certain other embodiments, the first cavity of the first side surface 242 may have a length between 30% and 120%, inclusive, of the width, $W_1$, of the first side surface 233.

With continued reference to the non-limiting embodiment shown in FIGS. 2a-2c, second cavity of the first side surface 246 may be an elongated linear slot. In certain other embodiments, the second cavity of the first side surface 246 may comprise one or more of an elongated curvilinear slot or a dimple. The second cavity of the first side surface 246 defines a second axis of elongation 248. The second cavity of the first side surface 246 has a cross-section perpendicular to the second axis of elongation 248 that is substantially semi oval. In certain other embodiments, the first cavity of the first side surface may have a cross-section that is substantially semicircular, semi-oval, semielliptical, a parabolic section, a hyperbolic section, or another shape chosen with good engineering judgment. In the non-limiting embodiment shown in FIGS. 2a-2c, the second cavity of the first side surface 246 extends the full width, $W_1$, of the first side surface 233. In certain other embodiments, the second cavity of the first side surface 246 may have a length less than or greater than the width, $W_1$, of the first side surface 233. In certain other embodiments, the second cavity of the first side surface 246 may have a length between 30% and 120%, inclusive, of the width, $W_1$, of the first side surface 233.

With continued reference to the non-limiting embodiment shown in FIGS. 2a-2c, a second side surface 234 may be oriented at a second angle ψ to the top surface 232. In certain other embodiments, a second side surface 234 may be oblique to a top surface 232. Second angle ψ may be greater than 90 degrees, between 100 and 150 degrees, inclusive, between 120 and 130 degrees, inclusive, or some other angle chosen with good engineering judgment. Second side surface 234 may have a height, $H_2$, and a width, $W_2$. Second side surface 234 may comprise a first cavity of the second side surface 252. Second side surface 234 may comprise a second cavity of the second side surface 256.

With continued reference to the non-limiting embodiment shown in FIGS. 2a-2c, the first cavity of the second side surface 252 may be an elongated linear slot. In certain other embodiments, the first cavity of the second side surface 252 may comprise one or more of an elongated curvilinear slot or a dimple. The first cavity of the second side surface 252 defines a third axis of elongation 254. The first cavity of the second side surface 252 has a cross-section perpendicular to the third axis of elongation 254 that is substantially semi-oval. In certain other embodiments, the first cavity of the second side surface may have a cross-section that is substantially semicircular, semi-oval, semielliptical, a parabolic section, a hyperbolic section, or another shape chosen with good engineering judgment. In the non-limiting embodiment shown in FIGS. 2a-2c, the first cavity of the second side surface 252 extends the full width, $W_2$, of the second side surface 234. In certain other embodiments, the first cavity of the second side surface 252 may have a length less than or greater than the width, $W_2$, of the second side surface 234. In certain other embodiments, the first cavity of the second side surface 252 may have a length between 30% and 120%, inclusive, of the width, $W_2$, of the second side surface 234.

With continued reference to the non-limiting embodiment shown in FIGS. 2a-2c, second cavity of the second side surface 256 may be an elongated linear slot. In certain other embodiments, the second cavity of the second side surface 256 may comprise one or more of an elongated curvilinear slot or a dimple. The second cavity of the second side surface 256 defines a fourth axis of elongation 258. The second cavity of the second side surface 256 has a cross-section perpendicular to the fourth axis of elongation 258 that is substantially semi-oval. In certain other embodiments, the second cavity of the second side surface may have a cross-section that is substantially semicircular, semi-oval, semielliptical, a parabolic section, a hyperbolic section, or another shape chosen with good engineering judgment. In the non-limiting embodiment shown in FIGS. 2a-2c, the second cavity of the second side surface 256 extends the full width, $W_2$, of the second side surface 234. In certain other embodiments, the second cavity of the second side surface 256 may have a length less than or greater than the width, $W_2$, of the second side surface 234. In certain other embodiments, the second cavity of the second side surface 256 may have a length between 30% and 120%, inclusive, of the width, $W_2$, of the second side surface 234.

The non-limiting embodiment shown in FIGS. 3a-3c shows a tire lug 320 may be bounded by a plurality of surfaces 330 such as, without limitation, a top surface 332, a first side surface 333, a second side surface 334, a third side surface 335, and a fourth side surface 336, a fifth side surface 337, and a sixth side surface 338.

With continued reference to the non-limiting embodiment shown in FIGS. 3a-3c, a first side surface 333 may be oriented at a first angle φ to the top surface 332. In certain other embodiments, a first side surface 333 may be oblique to a top surface 332. First angle φ may be greater than 90 degrees, between 100 and 150 degrees, inclusive, between 120 and 130 degrees, inclusive, or some other angle chosen with good engineering judgment. First side surface 333 may have a height, $H_1$, and a width, $W_1$. First side surface 333 may comprise a first cavity of the first side surface 342. First side surface 333 may comprise a second cavity of the first side surface 346.

With continued reference to the non-limiting embodiment shown in FIGS. 3a-3c, the first cavity of the first side surface 342 may be an elongated curvilinear slot. In certain other embodiments, the first cavity of the first side surface 342 may comprise one or more of an elongated linear slot or a dimple. The first cavity of the first side surface 342 has a cross-section that is substantially semi-oval. In certain other embodiments, the first cavity of the first side surface may have a cross-section that is substantially semicircular, semi-oval, semielliptical, a parabolic section, a hyperbolic section, or another shape chosen with good engineering judgment. In the non-limiting embodiment shown in FIGS. 3a-3c, the first cavity of the first side surface 342 extends the full width, $W_1$, of the first side surface 333. Because the first cavity of the first side surface 342 is curved, it is longer than the width, $W_1$, of the first side surface 333. In certain other embodiments, the first cavity of the first side surface 342 may have a length less than or equal to the width, $W_1$, of the first side surface 333. In certain embodiments, the first cavity of the first side surface 342 may have a length between 30% and 120%, inclusive, of the width, $W_1$, of the first side surface 333.

With continued reference to the non-limiting embodiment shown in FIGS. 3a-3c, second cavity of the first side surface 346 may be an elongated curvilinear slot. In certain other embodiments, the second cavity of the first side surface 346 may comprise one or more of an elongated linear slot or a dimple. The second cavity of the first side surface 346 has a cross-section that is substantially semi-oval. In certain other embodiments, the first cavity of the first side surface may have a cross-section that is substantially semicircular, semi-oval, semielliptical, a parabolic section, a hyperbolic section, or another shape chosen with good engineering judgment. In the non-limiting embodiment shown in FIGS. 3a-3c, the second cavity of the first side surface 346 extends the full width, $W_1$, of the first side surface 333. Because the second cavity of the first side surface 346 is curved, it is longer than the width, $W_1$, of the first side surface 333. In certain other embodiments, the second cavity of the first side surface 346 may have a length less than or equal to the width, $W_1$, of the first side surface 333. In certain embodiments, the second cavity of the first side surface 346 may have a length between 30% and 120%, inclusive, of the width, $W_1$, of the first side surface 333.

With continued reference to the non-limiting embodiment shown in FIGS. 3a-3c, a second side surface 334 may be oriented at a second angle ψ to the top surface 332. In certain other embodiments, a second side surface 334 may be oblique to a top surface 332. Second angle ψ may be greater than 90 degrees, between 100 and 150 degrees, inclusive, between 120 and 130 degrees, inclusive, or some other angle chosen with good engineering judgment. Second side surface 334 may have a height, $H_2$, and a width, $W_2$. Second side surface 334 may comprise a first cavity of the second side surface 352. Second side surface 334 may comprise a second cavity of the second side surface 356.

With continued reference to the non-limiting embodiment shown in FIGS. 3a-3c, the first cavity of the second side surface 352 may be an elongated curvilinear slot. In certain other embodiments, the first cavity of the second side surface 352 may comprise one or more of an elongated linear slot or a dimple. The first cavity of the second side surface 352 has a cross-section that is substantially semi-oval. In certain other embodiments, the first cavity of the second side surface may have a cross-section that is substantially semicircular, semi-oval, semielliptical, a parabolic section, a hyperbolic section, or another shape chosen with good engineering judgment. In the non-limiting embodiment shown in FIGS. 3a-3c, the first cavity of the second side surface 352 extends the full width, $W_2$, of the second side surface 334. Because the first cavity of the second side surface 352 is curved, it is longer than the width, $W_2$, of the second side surface 334. In certain other embodiments, the first cavity of the second side surface 352 may have a length less than or equal to the width, $W_2$, of the second side surface 334. In certain other embodiments, the first cavity of the second side surface 352 may have a length between 30% and 120%, inclusive, of the width, $W_2$, of the second side surface 334.

With continued reference to the non-limiting embodiment shown in FIGS. 3a-3c, second cavity of the second side surface 356 may be an elongated curvilinear slot. In certain other embodiments, the second cavity of the second side surface 356 may comprise one or more of an elongated linear slot or a dimple. The second cavity of the second side surface 356 has a cross-section that is substantially semi oval. In certain other embodiments, the second cavity of the second side surface may have a cross-section that is substantially semicircular, semi-oval, semielliptical, a parabolic section, a hyperbolic section, or another shape chosen with good engineering judgment. In the non-limiting embodiment shown in FIGS. 3a-3c, the second cavity of the second side surface 356 extends the full width, $W_2$, of the second side surface 334. Because the second cavity of the second side surface 356 is curved, it is longer than the width, $W_2$, of the second side surface 334. In certain other embodiments, the second cavity of the second side surface 356 may have a length less than or equal to the width, $W_2$, of the second side surface 334. In certain other embodiments, the second cavity of the second side surface 356 may have a length between 30% and 120%, inclusive, of the width, $W_2$, of the second side surface 334.

Figure 4:
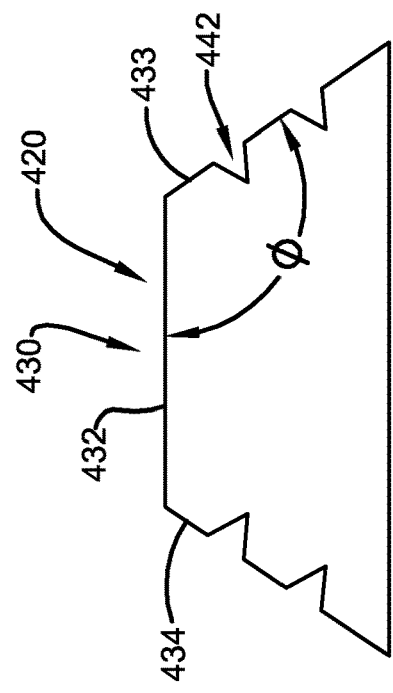
FIG. 4 is a cross-section of a third embodiment of a tire lug.

The non-limiting embodiments shown in FIG. 4 shows a cross-section of a tire lug 420 that may be bounded by a plurality of surfaces 430 such as, without limitation, a top surface 432, a first side surface 433, and a second side surface 434. First side surface 433 may be oriented at a first angle φ to the top surface 432. First angle φ may be greater than 90 degrees, between 100 and 150 degrees, inclusive, between 120 and 130 degrees, inclusive, or some other angle chosen with good engineering judgment. First side surface 433 comprises a first cavity of the first side surface 442 which is substantially triangular in cross-section.

Figure 5:
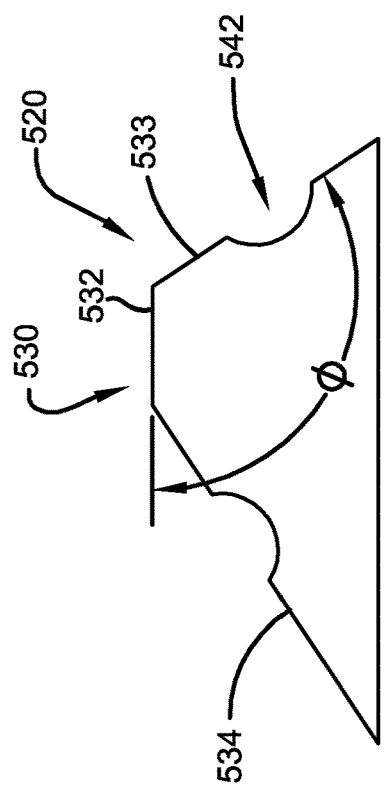
FIG. 5 is a cross-section of a fourth embodiment of a tire lug.

The non-limiting embodiments shown in FIG. 5 shows a cross-section of a tire lug 520 that may be bounded by a plurality of surfaces 530 such as, without limitation, a top surface 532, a first side surface 533, and a second side surface 534. First side surface 533 may be oriented at a first angle φ to the top surface 532. First angle φ may be greater than 90 degrees, between 100 and 150 degrees, inclusive, between 120 and 130 degrees, inclusive, or some other angle chosen with good engineering judgment. First side surface 533 comprises a first cavity of the first side surface 542 the cross-section of which may be an elliptical section, a parabolic section, or a hyperbolic section.

Figure 6:
FIG. 6 is a cross-section of a fifth embodiment of a tire lug.

The non-limiting embodiments shown in FIG. 6 shows a cross-section of a tire lug 620 that may be bounded by a plurality of surfaces 630 such as, without limitation, a top surface 632, a first side surface 633, and a second side surface 634. First side surface 633 may be oriented at a first angle ϕ to the top surface 632. First angle ϕ may be greater than 90 degrees, between 100 and 150 degrees, inclusive, between 120 and 130 degrees, inclusive, or some other angle chosen with good engineering judgment. First side surface 633 comprises a first cavity of the first side surface 642 which is substantially semi-circular.

Figure 7:
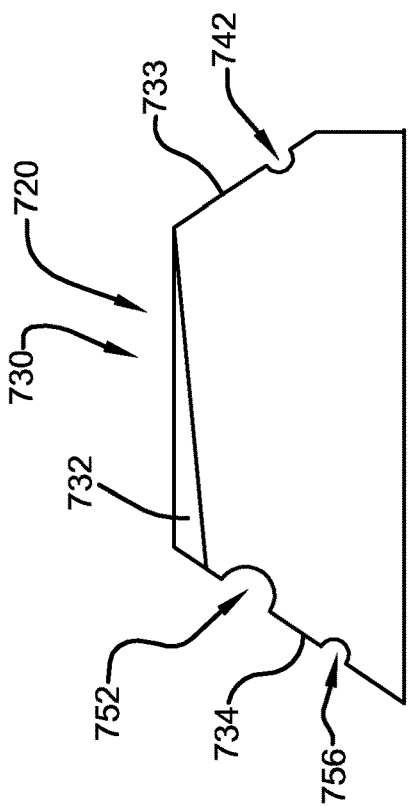
FIG. 7 is a cross-section of a sixth embodiment of a tire lug.

The non-limiting embodiments shown in FIG. 7 shows a cross-section of a tire lug 720 that may be bounded by a plurality of surfaces 730 such as, without limitation, a top surface 732, a first side surface 733, and a second side surface 734. First side surface 733 comprises a first cavity of the first side surface 742 which is substantially semi-circular. Second side surface 734 comprises a first cavity of the second side surface 752 which is differs in size substantially from that of first cavity of the first side surface 742. Second side surface 734 comprises a second cavity of the second side surface 756 which is differs in size substantially from that of the first cavity of the first side surface 742 and from that of the first cavity of the second side surface 752.

Without wishing to be bound to any particular theory, it is to be understood, that cavities 142, 146, 152, 156, 242, 246, 252, 256, 342, 346, 352, 356, 442, 542, 642, 742, 752, 756 may capture or retain material with which it comes into contact during operation. A cavity 142, 146, 152, 156, 242, 246, 252, 256, 342, 346, 352, 356, 442, 542, 642, 742, 752, 756 may be adapted to retain material such as dirt, gravel, pebbles, sand, clay, mud, snow, ice, or other debris. The properties of the cavity, such as, without limitation, the dimensions of the cavity, cavity width, cavity height, α, cavity depth, β, cavity cross section, the angle of the opening of the cavity with respect to the footprint of the tire, may be selected with good engineering judgment. It may possible to design a cavity to be better at retaining a particular material or materials, such as, without limitation, mud or snow, than at retaining one or more other materials, such as, without limitation, dirt, gravel, pebbles, sand, or clay. Retained material that is similar or substantially identical to the roadway material of the operational surface may provide an improvement in tire traction by increasing frictional or cohesive forces between the roadway material engaged with the external surface of the tire tread and similar roadway material in or on the operational surface upon which the tire is operated.

The non-limiting embodiments shown in FIG. 1 show that circumferentially spaced on one side of material inclusion tire tread lug 120 may be a first tire tread lug that is bounded by a plurality of surfaces such as, without limitation, a top surface and four side surfaces. In one embodiment, shown, a side surface of the first lug may be smooth, lacking cavities and face side surface 134 of the tire lug 120. In some embodiments, these two side surfaces, side surface 134 and the side surface of the first tire lug that faces side surface 134, may have the same height. As also shown in FIG. 1, a tread groove may be positioned between material inclusion tire tread 120 and the first tire tread lug. Also shown, in some embodiments, circumferentially spaced on the opposite side of material inclusion tire tread lug 120 may be a second tire tread lug that is bounded by a plurality of surfaces such as, without limitation, a top surface and four side surfaces. In one embodiment, show, a side surface of the second lug may be smooth, lacking cavities and face side surface 133 of the tire lug 120. In some embodiments, these two side surfaces, side surface 133 and the side surface of the second tire lug that faces side surface 133, may have the same height. As also shown in FIG. 1, a tread groove may be position between material inclusion tire tread 120 and the second tire tread lug.

While the material inclusion tread has been described above in connection with certain embodiments, it is to be understood that other embodiments may be used or modifications and additions may be made to the described embodiments for performing the same function of the material inclusion tread without deviating therefrom. Further, the material inclusion tread may include embodiments disclosed but not described in exacting detail. Further, all embodiments disclosed are not necessarily in the alternative, as various embodiments may be combined to provide the desired characteristics. Variations can be made by one having ordinary skill in the art without departing from the spirit and scope of the material inclusion tread. Therefore, the material inclusion tread should not be limited to any single embodiment, but rather construed in breadth and scope in accordance with the recitation of the attached claims.

What is claimed is:

1. A tire comprising: a radial direction;
an axial direction;
a circumferential direction; and
a first tire lug bounded by a first plurality of surfaces, said first plurality of surfaces comprising,
a top surface of the first tire lug, said top surface of the first tire lug extending in the axial direction and the circumferential direction,
a first side surface of the first tire lug oriented at a first angle to the top surface of the first tire lug,
said first side surface of the first tire lug having a height and a width,
said first side surface of the first tire lug comprising a first cavity of the first side surface of the first tire lug that is an elongated linear slot,
said first side surface of the first tire lug comprising a second cavity of the first side surface of the first tire lug that is an elongated linear slot,
wherein the second cavity of the first side surface of the first tire lug is parallel to the first cavity of the first side surface of the first tire lug; and
a second side surface of the first tire lug oriented at a second angle to the top surface,
said second side surface of the first tire lug having a height and a width,
said second side surface of the first tire lug comprising a first cavity of the second side surface of the first tire lug that is an elongated linear slot,
said second side surface of the first tire lug comprising a second cavity of the second side surface of the first tire lug that is an elongated linear slot, and
wherein the second cavity of the second side surface of the first tire lug is parallel to the first cavity of the second side surface of the first tire lug; and
a second tire lug adjacent to the first tire lug and offset from the first tire lug by a tread groove therebetween, the second tire lug being bounded by a second plurality of surfaces, said second plurality of surfaces comprising, a top surface of the second tire lug, said top surface of the second tire lug extending in the axial direction and the circumferential direction, and a first side surface of the second tire lug oriented at a first angle to the top surface of the second tire lug, said first side surface of the second tire lug having a height and a width, said first side surface of the second first tire lug facing the second side surface of the first tire lug across the tread groove, and said first side surface of the second tire lug being smooth and lacking cavities, and wherein a circumferential plane that bisects the second side surface of the first tire lug into two equal lengths intersects the first side surface of the second tire lug.

2. The tire of claim 1 wherein, the first cavity of the first side surface of the first tire lug has a cross-section; the second cavity of the first side surface of the first tire lug has a cross-section; and the cross-section of the first cavity of the first side surface of the first tire lug is the same size as the cross-section of the second cavity of the first side surface of the first tire lug.

3. The tire of claim 2 wherein, the first cavity of the second side surface of the first tire lug has a cross-section; the second cavity of the second side surface of the first tire lug has a cross-section; and the cross-section of the first cavity of the second side surface of the first tire lug is the same size as the cross-section of the second cavity of the second side surface of the first tire lug.

4. The tire of claim 3 wherein, the first cavity of the first side surface of the first tire lug has a cross-section that is parabolic.

5. The tire of claim 4 wherein, the second cavity of the first side surface of the first tire lug has a cross-section that is parabolic.

6. The tire of claim 5 wherein, the first cavity of the second side surface of the first tire lug has a cross-section that is parabolic.

7. The tire of claim 6 wherein, the second cavity of the second side surface of the first tire lug has a cross-section that is parabolic.

8. The tire of claim 7 wherein, the first cavity of the second side surface of the first tire lug is parallel to the first cavity of the first side surface of the first tire lug.

9. The tire of claim 8 wherein, the width of the second side surface of the first tire lug is the same as the width of the first side surface of the first tire lug.

10. The tire of claim 9 wherein, the height of the second side surface of the first tire lug is the same as the height of the first side surface of the first tire lug.

11. The tire of claim 9 wherein, the height of the first side surface of the second tire lug is the same as the height of the first side surface of the first tire lug.

12. The tire of claim 1 wherein:

the tread groove has a radial depth; and at least one of said first cavity of the first side surface of the first tire lug and said first cavity of the second side surface of the first tire lug is positioned radially above a radial mid-point of the radial depth.

13. A tire comprising: a radial direction; an axial direction;

a circumferential direction; and a first tire lug bounded by a first plurality of surfaces, said first plurality of surfaces comprising, a top surface of the first tire lug, said top surface of the first tire lug extending in the axial direction and the circumferential direction, a first side surface of the first tire lug oriented at a first angle to the top surface of the first tire lug, said first side surface of the first tire lug having a height and a width, said first side surface of the first tire lug comprising a first cavity of the first side surface of the first tire lug that is an elongated linear slot, said first side surface of the first tire lug comprising a second cavity of the first side surface of the first tire lug that is an elongated linear slot, wherein the second cavity of the first side surface of the first tire lug is parallel to the first cavity of the first side surface of the first tire lug; and a second side surface of the first tire lug oriented at a second angle to the top surface, said second side surface of the first tire lug having a height and a width, said second side surface of the first tire lug comprising a first cavity of the second side surface of the first tire lug that is an elongated linear slot, said second side surface of the first tire lug comprising a second cavity of the second side surface of the first tire lug that is an elongated linear slot, and wherein the second cavity of the second side surface of the first tire lug is parallel to the first cavity of the second side surface of the first tire lug;

a second tire lug adjacent to the first tire lug and offset from the first tire lug by a tread groove therebetween, the second tire lug being bounded by a second plurality of surfaces, said second plurality of surfaces comprising, a top surface of the second tire lug, said top surface of the second tire lug extending in the axial direction and the circumferential direction, and a first side surface of the second tire lug oriented at a first angle to the top surface of the second tire lug, said first side surface of the second tire lug having a height and a width, wherein, said first side surface of the second tire lug facing the second side surface of the first tire lug across the tread groove, and said first side surface of the second tire lug being smooth and lacking cavities; and wherein, the first cavity of the first side surface of the first tire lug has a cross-section;

the second cavity of the first side surface of the first tire lug has a cross-section;

the cross-section of the first cavity of the first side surface of the first tire lug is the same size as the cross-section of the second cavity of the first side surface of the first tire lug;

the first cavity of the second side surface of the first tire lug has a cross-section;

the second cavity of the second side surface of the first tire lug has a cross-section;

the cross-section of the first cavity of the second side surface of the first tire lug is the same size as the cross-section of the second cavity of the second side surface of the first tire lug;

the first cavity of the first side surface of the first tire lug has a cross-section that is parabolic;

the second cavity of the first side surface of the first tire lug has a cross-section that is parabolic;

the first cavity of the second side surface of the first tire lug has a cross-section that is parabolic;

the second cavity of the second side surface of the first tire lug has a cross-section that is parabolic;

the first cavity of the second side surface of the first tire lug is parallel to the first cavity of the first side surface of the first tire lug;

the width of the second side surface of the first tire lug is the same as the width of the first side surface of the first tire lug;

the height of the second side surface of the first tire lug is the same as the height of the first side surface of the first tire lug;

the height of the first side surface of the second tire lug is the same as the height of the first side surface of the first tire lug; and a circumferential plane that bisects the second side surface of the first tire lug into two equal lengths intersects the first side surface of the second tire lug.

14. The tire of claim 13 wherein the first angle is between 120 and 130 inclusive.

15. The tire of claim 13 wherein:

the tread groove has a radial depth; and at least one of said first cavity of the first side surface of the first tire lug and said first cavity of the second side surface of the first tire lug is positioned radially above a radial mid-point of the radial depth.

* * * * *